US012003397B2

United States Patent
Nakatsukasa et al.

(10) Patent No.: US 12,003,397 B2
(45) Date of Patent: Jun. 4, 2024

(54) DELAY MEASUREMENT DEVICE, DELAY MEASUREMENT METHOD, AND DELAY MEASUREMENT PROGRAM

(71) Applicant: Nippon Telegraph and Telephone Corporation, Tokyo (JP)

(72) Inventors: Satoshi Nakatsukasa, Musashino (JP); Toshihiro Yokoi, Musashino (JP); Ken Takahashi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/022,699

(22) PCT Filed: Aug. 24, 2020

(86) PCT No.: PCT/JP2020/031809
§ 371 (c)(1),
(2) Date: Feb. 22, 2023

(87) PCT Pub. No.: WO2022/044069
PCT Pub. Date: Mar. 3, 2022

(65) Prior Publication Data
US 2023/0318955 A1  Oct. 5, 2023

(51) Int. Cl.
*H04L 43/0852* (2022.01)
*H04L 45/302* (2022.01)

(52) U.S. Cl.
CPC ........ *H04L 43/0858* (2013.01); *H04L 45/302* (2013.01)

(58) Field of Classification Search
CPC ............. H04L 43/0858; H04L 43/0864; H04L 43/106; H04L 41/5003; H04L 41/22;
(Continued)

(56) References Cited

U.S. PATENT DOCUMENTS

2002/0105911 A1* 8/2002 Pruthi ................. H04L 41/5003
370/474
2005/0099955 A1* 5/2005 Mohan ...................... H04L 1/24
370/242

(Continued)

OTHER PUBLICATIONS

Hedayat et al., "A Two-Way Active Measurement Protocol (TWAMP)," Network Working Group Request for Comments: 5357, Oct. 2008, retrieved from URL <https://tools.ietf.org/html/rfc5357>, 26 pages.

(Continued)

Primary Examiner — Djenane M Bayard
(74) Attorney, Agent, or Firm — Fish & Richardson P.C.

(57) ABSTRACT

A delay measurement device measures a delay time of an end-to-end route path of a virtual private network related to a predetermined user. The delay measurement device includes a measurement route generation unit configured to generate a first route that transfers to a start point node of a route path, transfers back on the route path, and then returns to itself, and to generate a second route of a route that transfers to the start point node of the route path and returns to itself; a packet transmission/reception unit configured to transmit and receive packets circulating on the first route; a delay measurement unit configured to measure a time from transmission of the packet to reception of the packet to set the measured time as a delay time of the route; and a one-way delay calculation unit configured to calculate a one-way delay time of the route path.

18 Claims, 13 Drawing Sheets

(58) Field of Classification Search
CPC . H04L 41/5029; H04L 43/026; H04L 43/028;
H04L 43/045; H04L 43/062; H04L
43/0829; H04L 43/0888; H04L 41/5061;
H04L 43/0852; H04L 43/091; H04L
41/142; H04L 43/0811; H04L 43/0835;
H04L 43/0841; H04L 43/10; H04L 45/02;
H04L 43/16; H04L 45/12; H04L 1/1685;
H04L 1/248; H04L 2463/121; H04L
41/0681; H04L 43/00; H04L 43/0882;
H04L 43/0894; H04L 43/18; H04L
45/037; H04L 45/123; H04L 45/18; H04L
45/28; H04L 5/1415; H04L 5/1423; H04L
63/108; H04L 63/1416; H04L 63/1425;
H04L 63/1458; H04L 65/1101; H04L
65/1104; H04L 65/762; H04L 65/80;
H04L 69/22; H04L 7/0075; H04L 12/43;
H04L 12/4625; H04L 41/0896; H04L
41/32; H04L 41/5009; H04L 45/04; H04L
45/22; H04L 47/50; H04L 47/522; H04L
47/562; H04L 49/205; H04L 49/30; H04L
43/087; H04L 43/50; H04L 43/20; H04L
43/12; H04L 45/34; H04L 45/32; H04L
45/26; H04L 45/245; H04L 45/033
See application file for complete search history.

(56) References Cited

U.S. PATENT DOCUMENTS

2009/0147806 A1* 6/2009 Brueckheimer ...... H04J 3/0667
370/503
2015/0023179 A1* 1/2015 Stein .................. H04L 43/0811
370/241.1

OTHER PUBLICATIONS

Postel, "Internet Control Message Protocol, DARPA Internet Program Protocol Specification," Network Working Group Request for Comments: 792, Sep. 1981, retrieved from URL <https://tools.ietf.org/html/rfc792>, 21 pages.

* cited by examiner

DELAY MEASUREMENT DEVICE, DELAY MEASUREMENT METHOD, AND DELAY MEASUREMENT PROGRAM

CROSS-REFERENCE TO RELATED APPLICATIONS

This application is a National Stage application under 35 U.S.C. § 371 of International Application No. PCT/JP2020/031809, having an International Filing Date of Aug. 24, 2020.

The disclosure of the prior application is considered part of the disclosure of this application, and is incorporated by reference in its entirety into this application.

TECHNICAL FIELD

The present invention relates to a delay measurement device, a delay measurement method, and a delay measurement program for measuring a delay time of a communication route in a communication network.

BACKGROUND ART

In recent years, networks have appeared in which a route path of a physical network for each virtual private network (VPN) can be explicitly designated by segment-routing or the like. This makes it possible to provide users with the optimum VPN route path based on communication delay, jitter, availability, and the like, which are individual service level agreement (SLA) requirements for each user.

CITATION LIST

Non Patent Literature

[NPL 1] RFC792, Internet Control Message Protocol, [online], [Retrieved on Aug. 12, 2020], Internet <URL: https://tools.ietf.org/html/rfc792>
[NPL 2] RFC5357 A Two-Way Active Measurement Protocol (TWAMP), [online], [Retrieved on Aug. 12, 2020], Internet <URL:https://tools.ietf.org/html/rfc5357>

SUMMARY OF INVENTION

Technical Problem

Conventionally, as a method of measuring communication delay, technologies such as Internet Control Message Protocol/Ping (ICMP/Ping) described in NPL 1 and Two-Way Active Measurement Protocol (TWAMP) described in NPL 2 have been used.

ICMP/Ping is a method of measuring round-trip propagation delay by providing a measurement device for each end point to be measured. In ICMP/Ping, an ICMP echo request message packet is sent from a measurement device located at one end point of one section of the network to be measured by designating a measurement device at the other end point by an IP address. After receiving this packet, the measurement device at the other end point sends an ICMP echo reply message back to the measurement device at one end point, which is the transmission source. Then, by measuring the time from when the measurement device at one end point sends the ICMP echo request until the ICMP echo reply message is received, the round-trip delay time of the section through which the packet has passed is measured.

ICMP/Ping does not require time synchronization between a measurement device on the transmitting side and a measurement device on the receiving side and has accuracy. However, ICMP/Ping requires a measurement device for each end point, which increases the cost. Also, since ICMP/Ping measures communication delay using IP transfer, there are links that cannot be measured depending on the policy.

Similarly to ICMP/Ping, TWAMP is a method of exchanging test packets between devices and measuring more information than Ping, such as median value, percentile, etc. regarding loss probability and delay amount. In TWAMP, one of two measurement devices operates as the transmitting side and the other operates as the receiving side to measure the delay.

TWAMP requires accurate time synchronization between a measurement device on the transmitting side and a measurement device on the receiving side. If there is a time lag between the measurement device on the transmitting side and the measurement device on the receiving side, it becomes difficult to measure the accurate transfer delay. Although network time protocol (NTP) is the mainstream of the current time synchronization technology between network devices, in the time synchronization technology using NTP, the accuracy of the time depends on the client, and it has been confirmed that a lag of about 800 us at maximum appears from the actual time. Therefore, there is a concern that a transfer delay amount cannot be measured accurately due to a time lag between the measurement device on the transmitting side and the measurement device on the receiving side.

In addition, TWAMP requires a measurement device for each end point, which increases the cost. Also, since TWAMP measures communication delay using IP transfer, there are links that cannot be measured depending on the policy.

Therefore, an object of the present invention is to measure communication delay having accuracy, economic efficiency, and comprehensiveness.

Solution to Problem

In order to achieve the above object, according to the invention of claim 1, there is provided a delay measurement device that measures a delay time of an end-to-end route path of a virtual private network related to a predetermined user, the device including: a measurement route generation unit configured to generate a first route that transfers to a start point node of a route path, transfers back on the route path, and then returns to itself and to generate a second route of a route that transfers to the start point node of the route path and returns to itself; a transmission/reception unit configured to transmit and receive packets circulating on the respective routes generated by the measurement route generation unit; a delay measurement unit configured to measure a time from transmission of the packet to reception of the packet by the transmission/reception unit to set the measured time as a delay time of the route; and a one-way delay calculation unit configured to calculate a one-way delay time of the route path by subtracting a delay time of the second route from a delay time of the first route measured by the delay measurement unit and dividing the difference by 2. Other means will be described in the mode for carrying out the invention.

Advantageous Effects of Invention

According to the present invention, it is possible to measure communication delay having accuracy, economic efficiency, and comprehensiveness.

DESCRIPTION OF EMBODIMENTS

Hereinafter, an embodiment of the present invention will be described in detail with reference to the drawings. The present invention measures communication delay of each VPN route path on a network.

Figure 1:
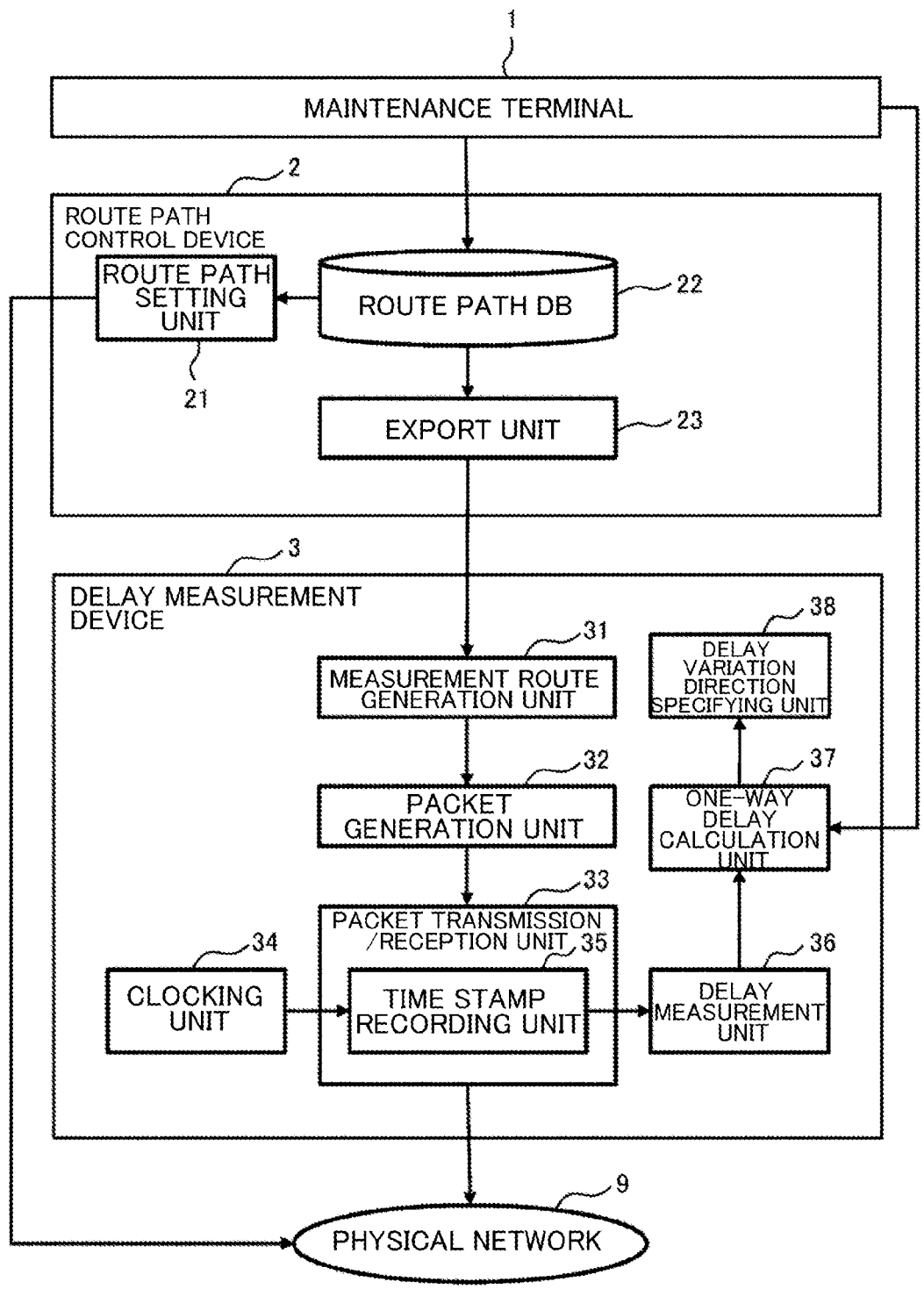
FIG. 1 is a configuration diagram of a system according to an embodiment.

FIG. 1 is a configuration diagram of a system according to the present embodiment. The system includes a maintenance terminal 1, a route path control device 2, and a delay measurement device 3, which are connected to a physical network 9.

The physical network 9 performs routing by advertising link state information of the network by interior gateway protocol (IGP) routing. IGP is a routing protocol such as Open Shortest Path First (OSPF) and Intermediate System to Intermediate System (IS-IS). Further, in the physical network 9, label switching by Segment-Routing/Multi-Protocol Label Switching (MPLS) is enabled. Thus, a plurality of nodes constituting the physical network 9 sequentially transfer packets to which the SR label stack is given to the nodes corresponding to labels stacked on the SR label stack. The delay measurement device 3 also participates in the physical network 9.

The route path control device 2 sets a route path to each router of the physical network 9. The route path control device 2 includes a route path setting unit 21, a route path database 22, and an export unit 23.

Figure 8:
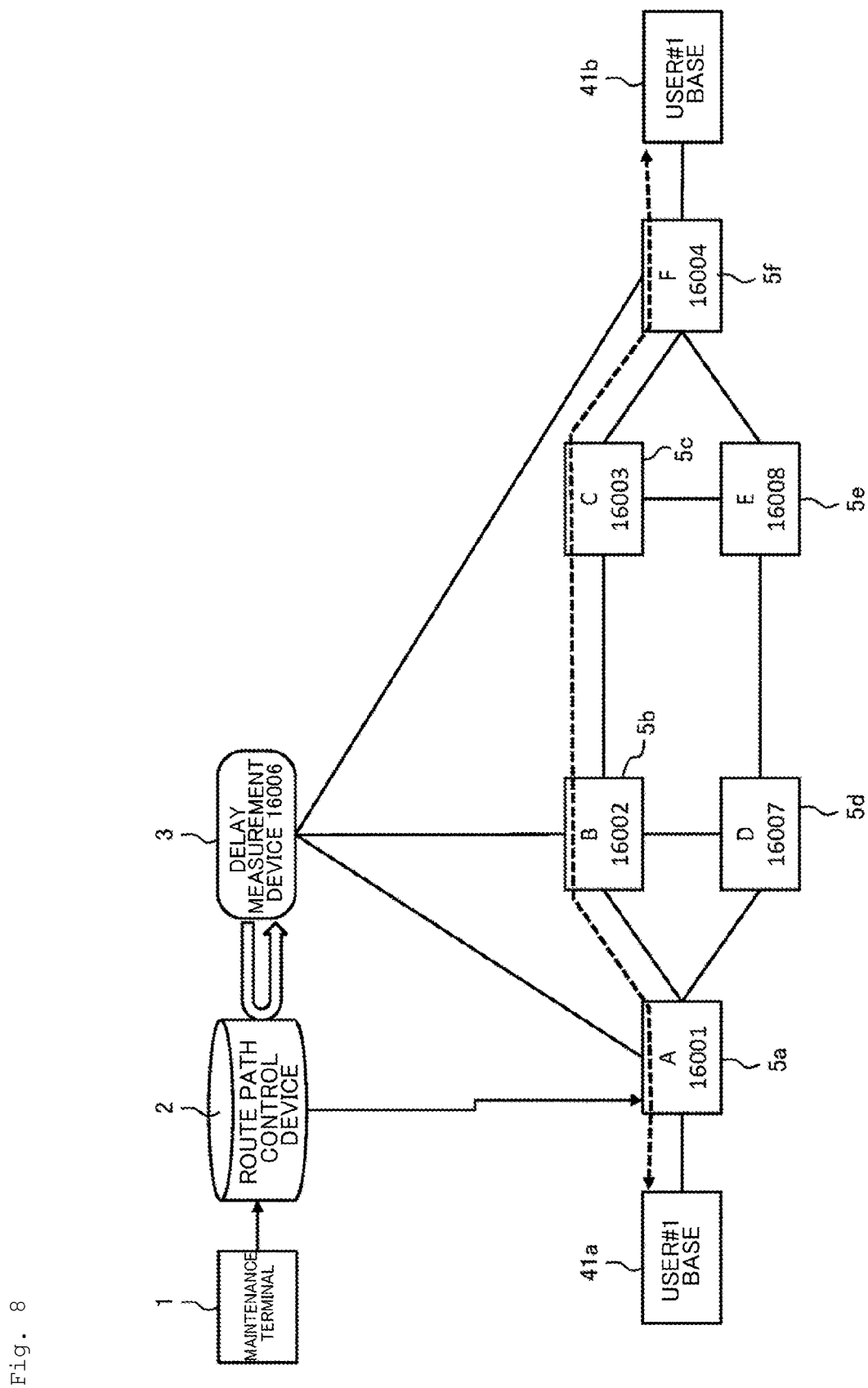
FIG. 8 is a diagram illustrating a route between bases.

The route path database 22 is a database that stores the VPN route path and the like of each user who uses the physical network 9. The route path setting unit 21 refers to the route path database 22 and sets the VPN route path of each user for each node constituting the physical network 9. The export unit 23 exports a VPN route path of a predetermined user from the route path database 22. An example of a VPN route path is illustrated in FIG. 8 which will be described later.

The delay measurement device 3 measures communication delay of an end-to-end route path of a virtual private network related to a predetermined user. The delay measurement device 3 includes a measurement route generation unit 31, a packet generation unit 32, a packet transmission/reception unit 33, a clocking unit 34, a delay measurement unit 36, a one-way delay calculation unit 37, and a delay variation direction specifying unit 38. The packet transmission/reception unit 33 includes a time stamp recording unit 35.

The measurement route generation unit 31 generates a first route 71 to a fourth route 74 from the VPN route path of the predetermined user, and outputs the generated first route 71 to the fourth route 74 to the packet generation unit 32.

Figure 9:
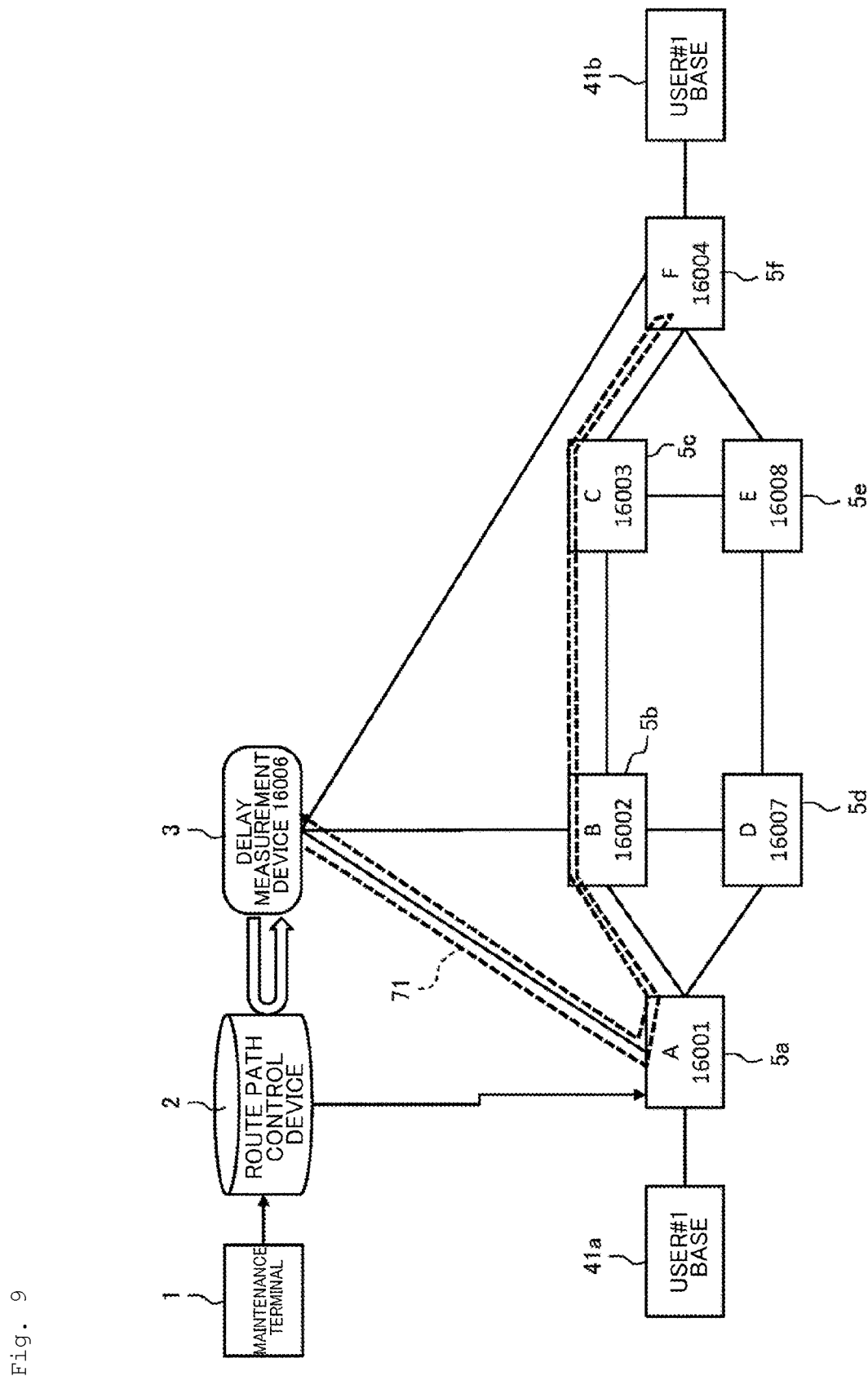
FIG. 9 is a diagram illustrating a first route.

The first route 71 is illustrated in FIG. 9, and is a route that passes through the VPN route path imported via a router 5a which is a start point node, turns back at a router 5d which is an end point node, and returns to the delay measurement device 3 via the router 5a which is the start point node. That is, the first route 71 is a route that transfers to the start point node of the VPN route path, transfers back on the VPN route path, and then returns to itself. The delay of the first route 71 is measured by a first measurement packet 61 illustrated in FIG. 4.

Figure 10:
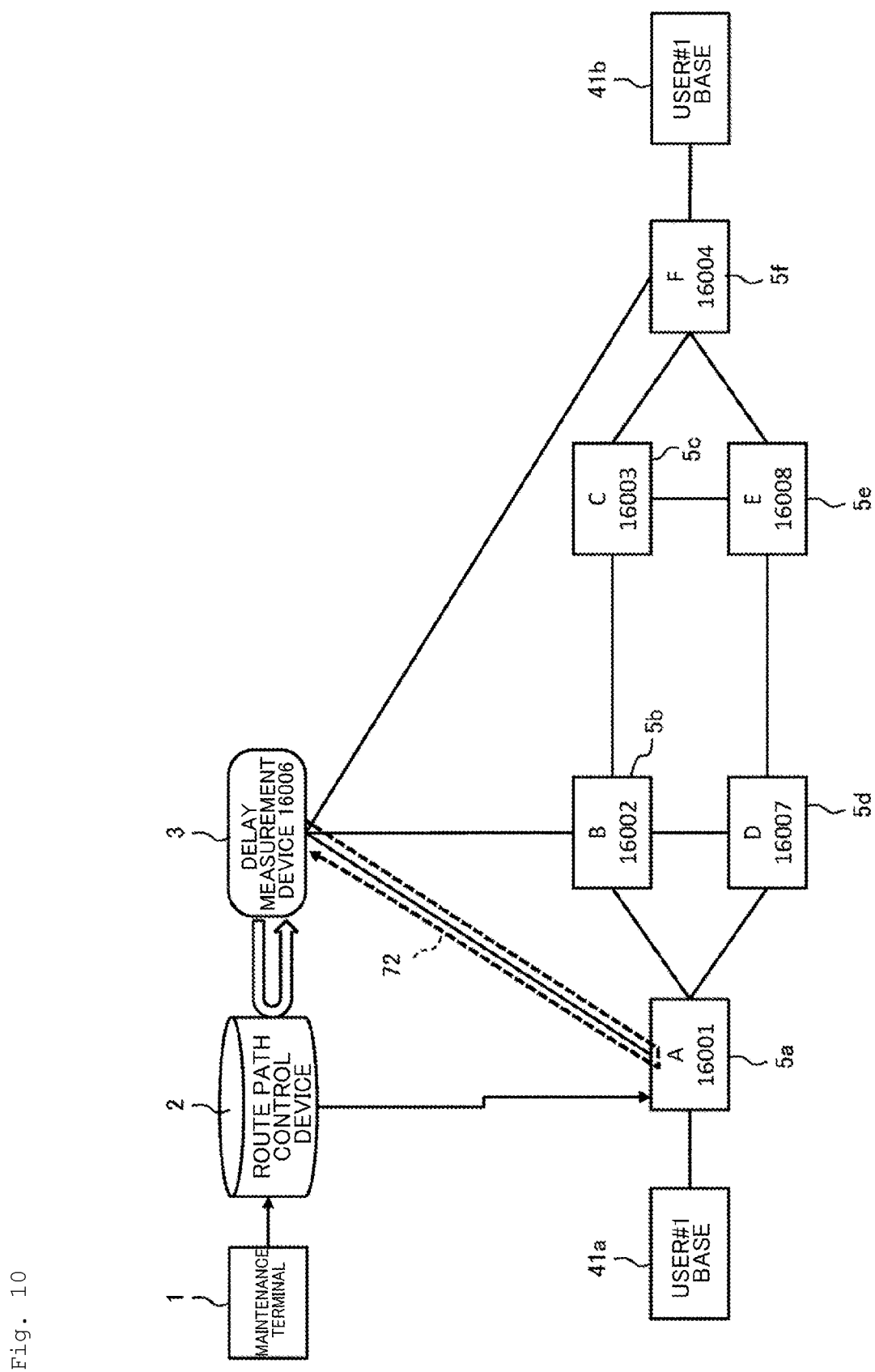
FIG. 10 is a diagram illustrating a second route.

The second route 72 is illustrated in FIG. 10, and is a route that returns to the delay measurement device 3 via the router 5a of the start point node. That is, the second route 72 is a route that transfers to the start point node of the VPN route path and returns to itself. The delay of the second route 72 is measured by a second measurement packet 62 illustrated in FIG. 5.

Figure 11:
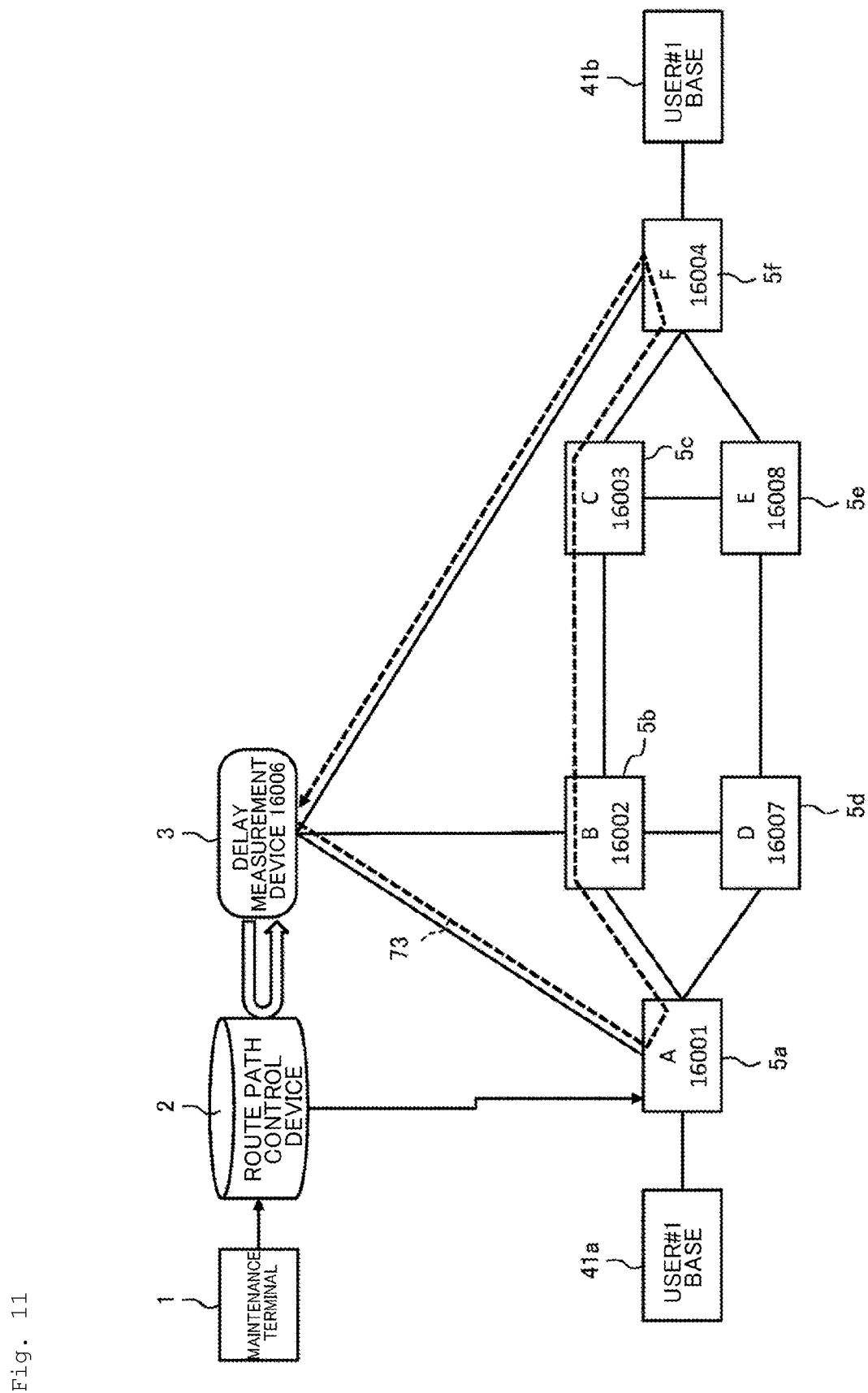
FIG. 11 is a diagram illustrating a third route.

The third route 73 is illustrated in FIG. 11, and is a route that passes through the VPN route path imported via the router 5a of the start point node, and returns to the delay measurement device 3 via the router 5f of the end point node. That is, the third route 73 is a route that transfers to the start point node of the VPN route path, transfers in one direction on the VPN route path, and then returns to itself. The delay of the third route 73 is measured by a third measurement packet 63 illustrated in FIG. 6.

Figure 12:
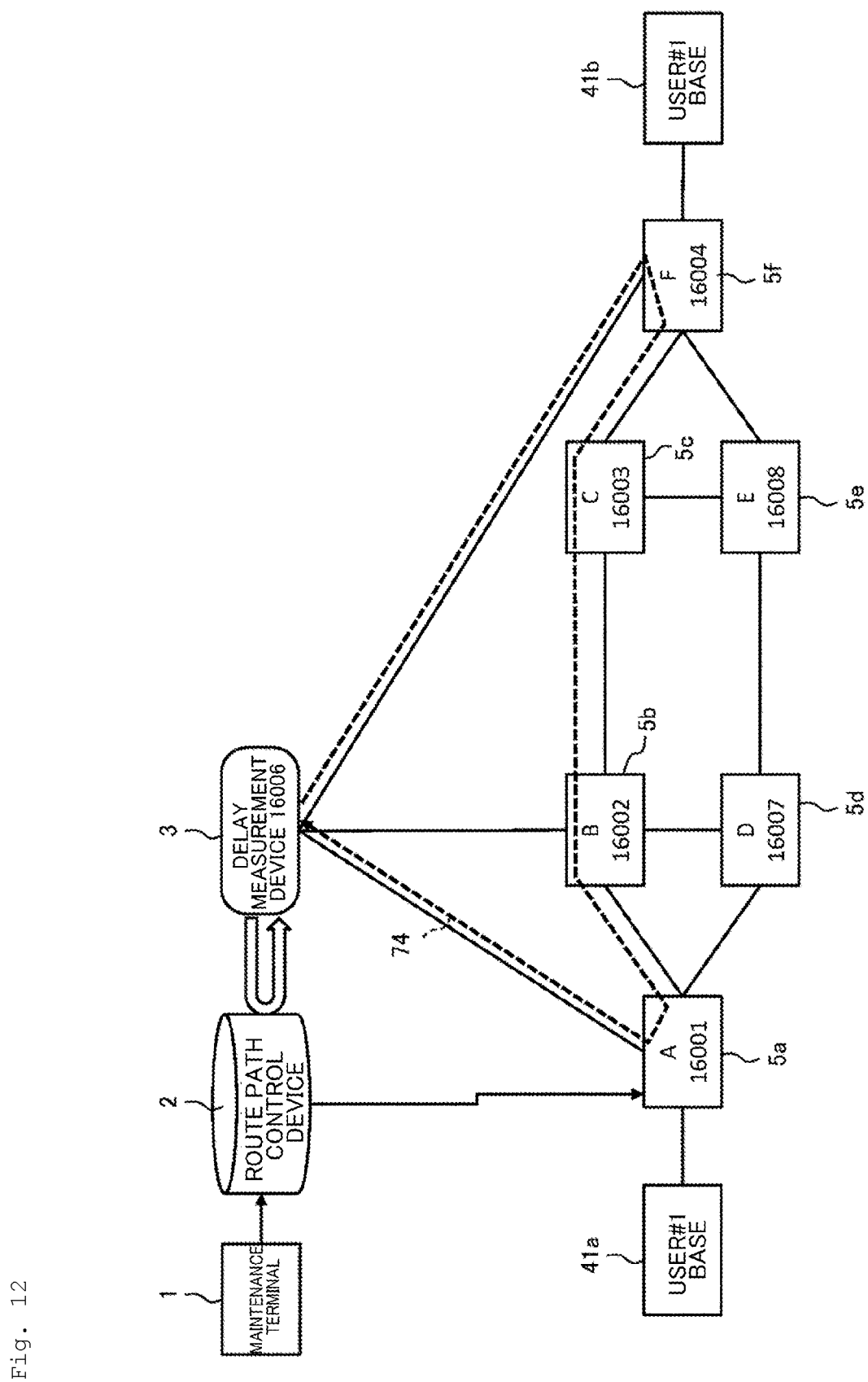
FIG. 12 is a diagram illustrating a fourth route.

The fourth route 74 is illustrated in FIG. 12, and is a route that passes through the VPN route path imported via the router 5f of the end point node in a reverse direction, and returns to the delay measurement device 3 via the router 5a of the start point node. That is, the fourth route 74 is a route that transfers to the end point node of the VPN route path, transfers in one direction on the VPN route path, and then returns to itself. The delay of the fourth route 74 is measured by a fourth measurement packet 64 illustrated in FIG. 7.

The packet generation unit 32 generates a symmetric round trip (SRT) packet or an asymmetric round trip (ART) packet for measurement according to each route input from the measurement route generation unit 31, and outputs the generated packet to the packet transmission/reception unit 33.

The SRT packet is a packet that is transferred to a specific transfer device and returns to the delay measurement device 3 through the same route, and is, for example, a first measurement packet 61 or a second measurement packet 62.

The ART packet is a packet that is placed on a specific link and passes only in one direction and returns to the delay measurement device 3, and is, for example, a third measurement packet 63 or a fourth measurement packet 64. The packet generation unit 32 records and generates route information in which SR labels (node identifiers) of each node of the route generated by the measurement route generation unit 31 are arranged in a packet transmitted to a communication network configured by connecting a plurality of nodes to each other.

Such SRT packets and ART packets are transferred by designating a route using a network protocol that can explicitly designate a route such as segment routing to be described later. Although the technology of segment routing has been described as an example in the present embodiment, the present invention is not limited to segment routing as long as the route can be designated. Note that segment routing means that each node of the network is represented by a segment identifier, and packet transfer between the nodes is realized by designating the segment identifier.

The packet transmission/reception unit 33 transmits each measurement packet input from the packet generation unit 32 to a router of the physical network 9, and receives the measurement packet returned by circulating a route of the physical network 9.

The clocking unit 34 is provided with a clocking function of time to perform a clocking operation, and outputs the time information to the time stamp recording unit 35.

The time stamp recording unit 35 records the time information of the clocking unit 34 in the measurement packet as a transmission time stamp when the measurement packet is transmitted by the packet transmission/reception unit 33. Further, when the measurement packet returned from the physical network 9 is received by the packet transmission/reception unit 33, the time information of the clocking unit 34 is recorded in the measurement packet as a reception time stamp.

The delay measurement unit 36 calculates a delay time from a difference between the transmission time stamp and the reception time stamp recorded in the measurement packet, and associates route information through which the measurement packet passes with the delay time information. That is, the delay measurement unit 36 measures a time from the transmission of the measurement packet by the packet transmission/reception unit 33 to the reception thereof, and sets the measured time as a delay time of the route where the measurement packet circulates.

The one-way delay calculation unit 37 calculates a one-way delay time of the VPN route path by adding a VPN route correction delay value to a value obtained by subtracting the delay time of the second route 72 (see FIG. 10) from the delay time of the first route 71 (see FIG. 9) and dividing the difference by 2. Thus, the delay measurement device 3 can calculate a more accurate one-way delay time of the route path. This VPN route correction delay value is input from, for example, the maintenance terminal 1. Since the delay measurement device 3 calculates the delay time of the route on the basis of the time information of the single clocking unit 34, the delay measurement device 3 does not require time synchronization between a plurality of devices and has accuracy. Since the delay measurement device 3 measures the delay time due to the transfer using the SR packet, an arbitrary link can be measured regardless of the policy of the link constituting the first route 71 (see FIG. 9).

When the one-way delay time calculated by the one-way delay calculation unit 37 varies, the delay variation direction specifying unit 38 specifies the direction of the delay variation from the delay time of the third route 73 (see FIG. 11) and the delay time of the fourth route 74 (see FIG. 12). Since the delay measurement device 3 measures the delay time due to the transfer using the SR packet, an arbitrary link can be measured regardless of the policy of the link constituting the third route 73 (see FIG. 11) or the fourth route 74 (see FIG. 12).

Figure 2:
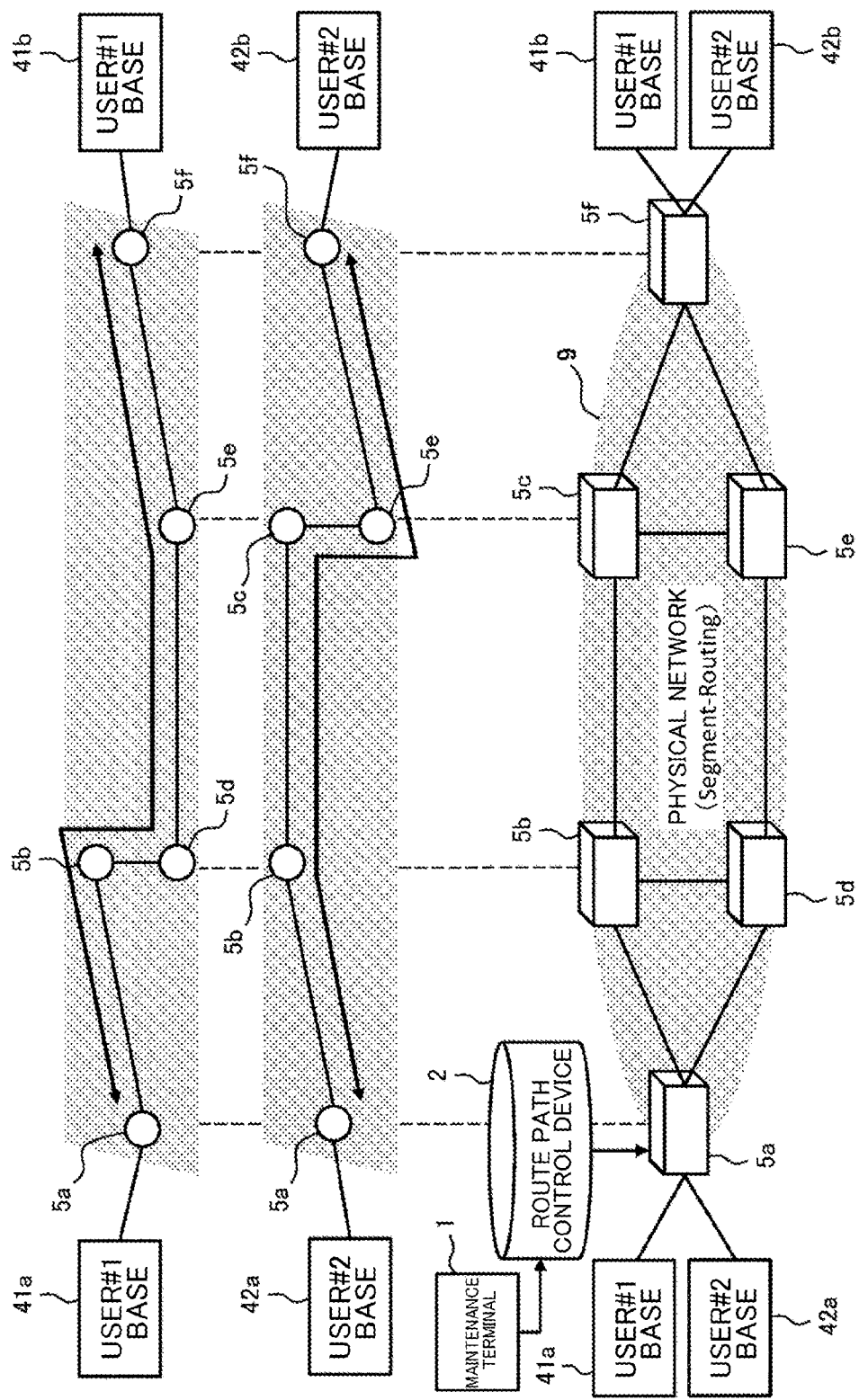
FIG. 2 is a diagram illustrating each node of a physical network and a VPN route of each user.

FIG. 2 is a diagram illustrating each node of the physical network 9 and a VPN route of each user. The physical network 9 is constituted by mutually connecting routers 5a to 5f. Terminal 41a and 42a are connected to a base which is one side of the physical network 9, and terminals 41b and 42b are connected to a base which is the other side of the physical network 9. The terminals 41a and 41b are devices related to a first user, and are VPN-connected by the VPN route path of the routers 5a, 5b, 5e, and 5f. The terminals 42a and 42b are devices related to a second user, and are VPN-connected by the VPN route path of the routers 5a, 5b, 5c, 5e, and 5f.

The route path control device 2 sets the VPN route path between the terminals of each user by controlling the routers 5a to 5f of the physical network 9.

Figure 3A:
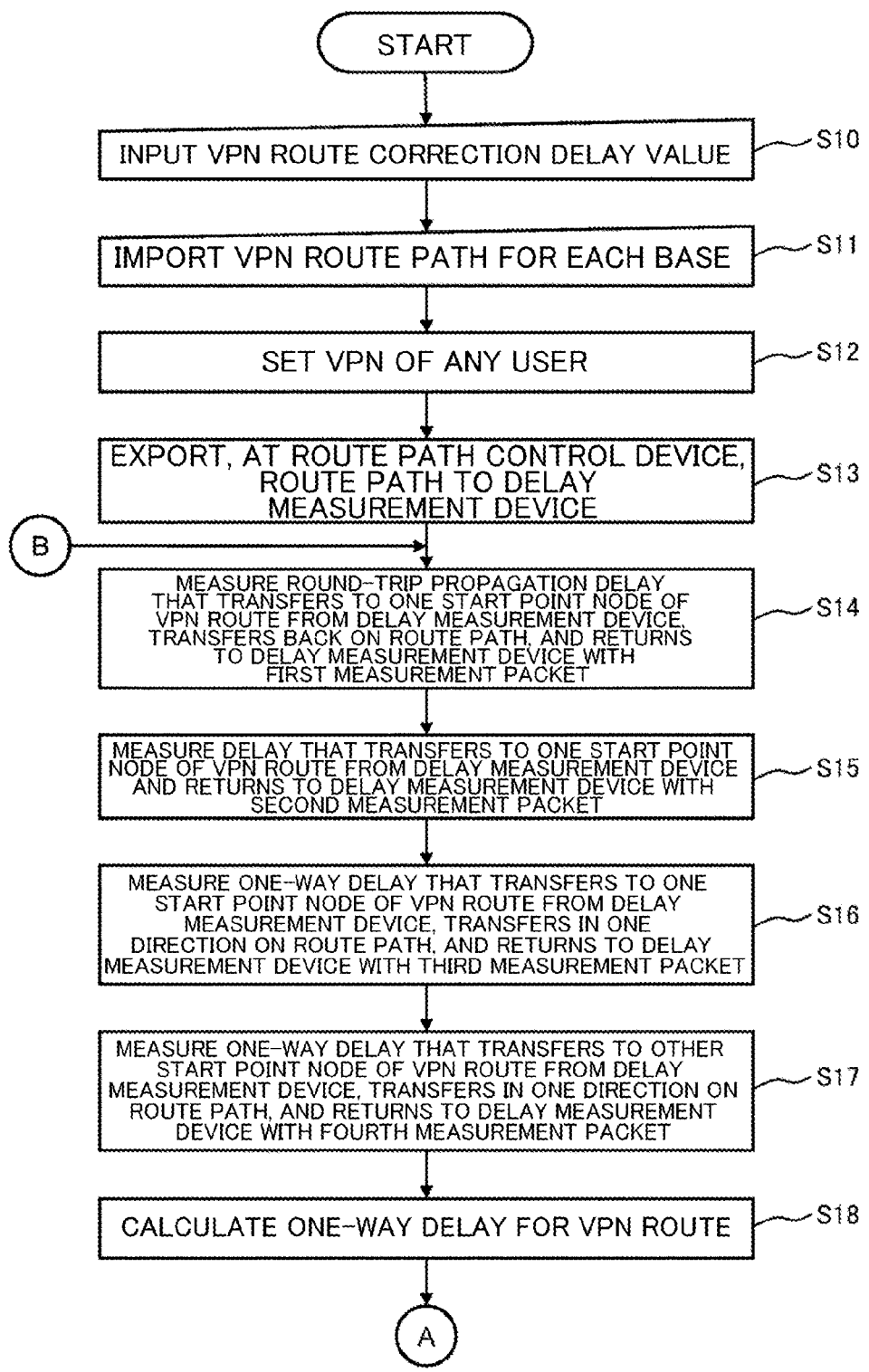
FIG. 3A is a flowchart of communication delay processing.
Figure 3B:
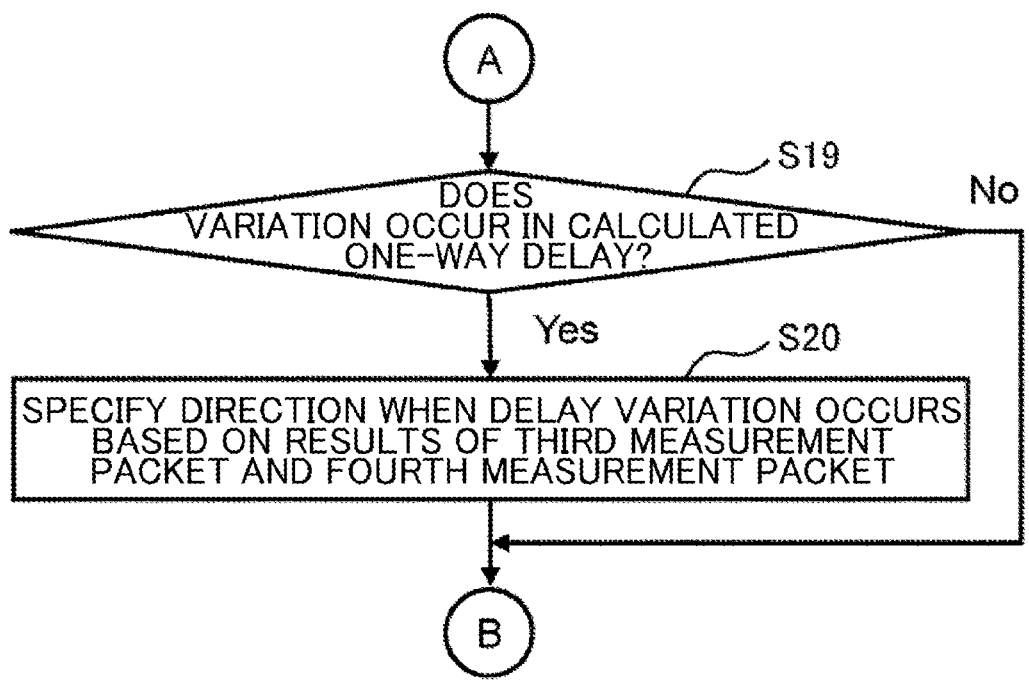
FIG. 3B is a flowchart of communication delay processing.

FIGS. 3A and 3B are flowcharts of communication delay processing.

The maintenance terminal 1 receives the input of the VPN route correction delay value (S10) and imports the VPN route path for each base (S11). Then, the route path control device 2 sets the VPN route path of any user (S12). Here, the route path control device 2 explicitly imports the information on the SR label stacked in the order of the nodes passing through the VPN route path between certain end points to a node that is a start point for the VPN defined for each user.

Next, the route path control device 2 exports the VPN route path to the delay measurement device 3 (S13). The delay measurement device 3 acquires the VPN route path information between the end points of the VPN from the route path control device 2. The delay measurement unit 36 of the delay measurement device 3 measures the delay time of the first route 71 that passes through the VPN route path imported via the start point node, turns back at the end point node, and returns to the delay measurement device 3 via the start point node with the first measurement packet 61 (S14). The value measured here is used for calculating the round-trip propagation delay.

The delay measurement unit 36 of the delay measurement device 3 measures the delay time of the second route 72 that returns to the delay measurement device 3 via the start point node with the second measurement packet 62 (S15). The value measured here is used for calculating the round-trip propagation delay.

The delay measurement unit 36 of the delay measurement device 3 measures the delay time of the third route 73 that passes through the VPN route path imported via the start point node, and returns to the delay measurement device 3 via the end point node with the third measurement packet 63 (S16). The value measured here is used for calculating the one-way delay.

The delay measurement unit 36 of the delay measurement device 3 measures the delay time of the fourth route 74 that passes through the VPN route path imported via the end point node in a reverse direction, and returns to the delay measurement device via the start point node with the fourth measurement packet 64 (S17). The value measured here is used for calculating the one-way delay.

The one-way delay calculation unit 37 of the delay measurement device 3 calculates one-way delay of the VPN route path by adding a VPN route correction delay value to a value obtained by subtracting the measurement result of the second measurement packet 62 from the measurement result of the first measurement packet 61 and dividing the difference by 2 (S18). The VPN route correction delay value is an additional transfer delay amount that occurs when the VPN traffic passes through the start point node. In communication between user bases, processing such as labeling is required when passing through the start point node, and therefore a VPN route correction delay value according to this processing time is added.

The delay variation direction specifying unit 38 of the delay measurement device 3 determines whether or not variation occurs in a value of the one-way delay while periodically acquiring the one-way delay (S19). In step S19, if variation occurs in the value of the one-way delay (Yes), the delay variation direction specifying unit 38 of the delay measurement device 3 specifies a direction when the delay variation occurs based on the measurement result of the third measurement packet 63 and the measurement result of the fourth measurement packet 64 (S20), and returns to the process of step S14. If no variation occurs in the value of the one-way delay (No), the delay variation direction specifying unit 38 of the delay measurement device 3 returns to the process of step S14.

If the measurement result of the third measurement packet 63 varies in step S20, the delay measurement device 3 determines that the variation has occurred in the direction from the start point node to the end point node on the VPN route path. If the measurement result of the fourth measurement packet 64 varies, the delay measurement device 3 determines that the variation has occurred in the direction from the end point node to the start point node on the VPN route path.

Figure 4:
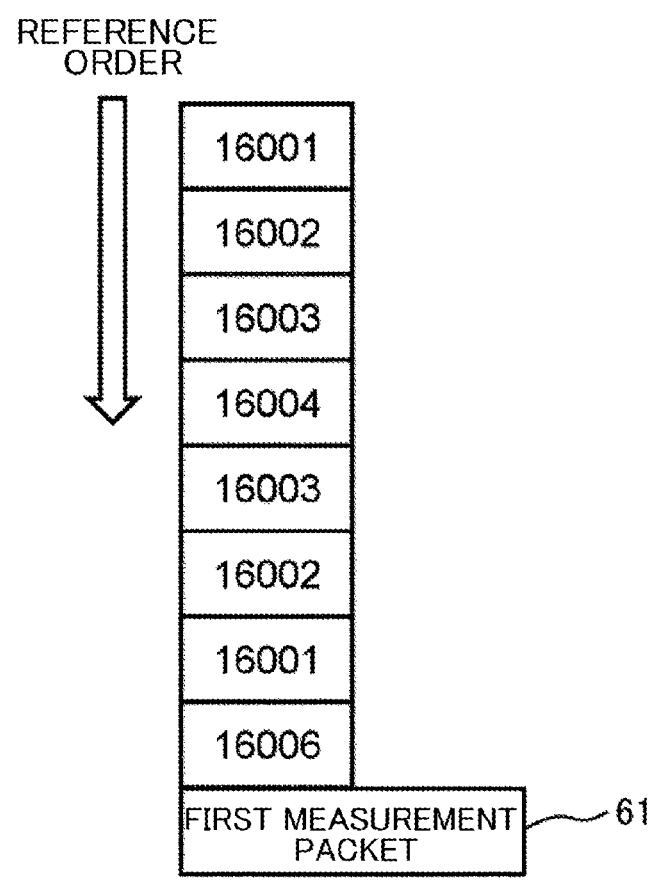
FIG. 4 is a diagram illustrating an SR label stack of a first measurement packet.

FIG. 4 is a diagram illustrating an SR label stack of the first measurement packet 61. Hereinafter, in common with FIGS. 4 to 7, the SR label stack is referred to in order from the top.

The SR (MPLS) label of each measurement packet is stacked with SID information of a router to be explicitly passed. The unstacked network area is transferred to the explicitly designated node based on routing information of an underlay (OSPF/ISIS, etc.).

Hereinafter, the SR label stack of the first measurement packet 61 and the first route 71 through which the first measurement packet 61 circulates will be described with reference to FIGS. 4 and 9.

At the top of the SR label stack of the first measurement packet 61, SID information 16001 is stacked. Thus, the first measurement packet 61 is transferred to the router 5*a* of the start point node of the VPN route path.

At the next SR label stack, SID information 16002, 16003, and 16004 are stacked. Thus, the first measurement packet 61 transferred to the router 5*a* is transferred to the router 5*f* of the end point node via the routers 5*b* and 5*c* on the VPN route path.

At the next SR label stack, SID information 16003, 16002, and 16001 are stacked. Thus, the first measurement packet 61 transferred to the router 5*f* is transferred to the router 5*a* of the start point node via the routers 5*c* and 5*b* on the VPN route path.

At the bottom of the SR label stack, SID information 16006 is stacked. Thus, the first measurement packet 61 transferred to the router 5*a* is returned to the delay measurement device 3.

Figure 5:
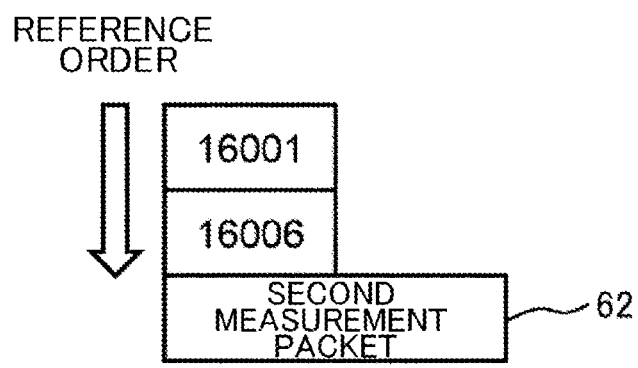
FIG. 5 is a diagram illustrating an SR label stack of a second measurement packet.

FIG. 5 is a diagram illustrating an SR label stack of the second measurement packet 62. Hereinafter, the SR label stack of the second measurement packet 62 and the second route 72 through which the second measurement packet 62 circulates will be described with reference to FIGS. 5 and 10.

At the top of the SR label stack of the second measurement packet 62, SID information 16001 is stacked. Thus, the second measurement packet 62 is transferred to the router 5*a* of the start point node of the VPN route path.

At the bottom of the next SR label stack, SID information 16006 is stacked. Thus, the second measurement packet 62 transferred to the router 5*a* is returned to the delay measurement device 3.

Figure 6:
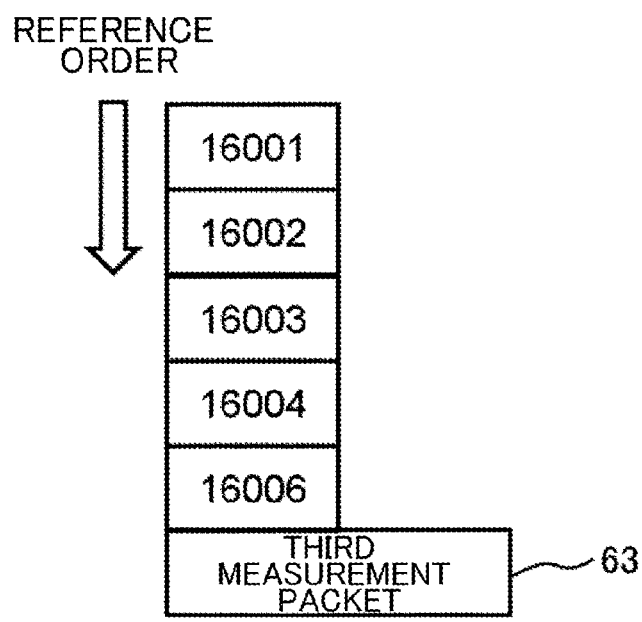
FIG. 6 is a diagram illustrating an SR label stack of a third measurement packet.

FIG. 6 is a diagram illustrating an SR label stack of the third measurement packet 63. Hereinafter, the SR label stack of the third measurement packet 63 and the third route 73 through which the third measurement packet 63 circulates will be described with reference to FIGS. 6 and 11.

At the top of the SR label stack of the third measurement packet 63, SID information 16001 is stacked. Thus, the third measurement packet 63 is transferred to the router 5*a* of the start point node of the VPN route path.

At the next SR label stack, SID information 16002, 16003, and 16004 are stacked. Thus, the third measurement packet 63 transferred to the router 5*a* is transferred in one direction to the router 5*f* of the end point node via the routers 5*b* and 5*c* on the VPN route path.

At the bottom of the next SR label stack, SID information 16006 is stacked. Thus, the third measurement packet 63 transferred to the router 5*f* is returned to the delay measurement device 3.

Figure 7:
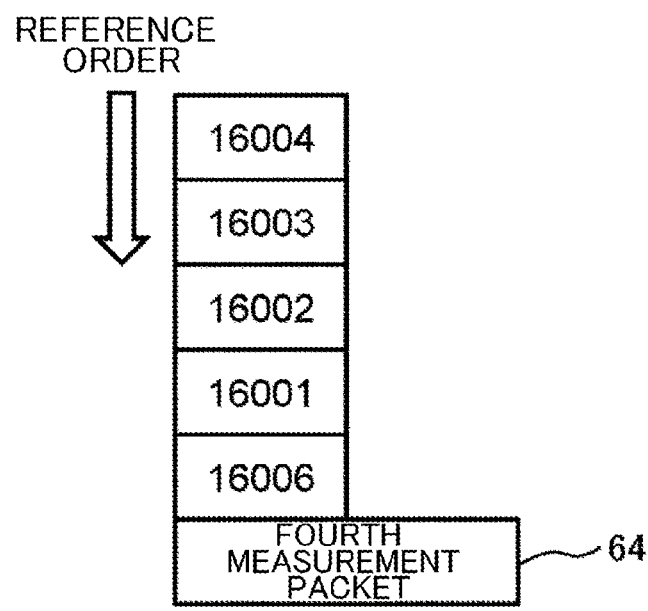
FIG. 7 is a diagram illustrating an SR label stack of a fourth measurement packet.

FIG. 7 is a diagram illustrating an SR label stack of the fourth measurement packet 64.

At the top of the SR label stack of the fourth measurement packet 64, SID information 16004 is stacked. Thus, the fourth measurement packet 64 is transferred to the router 5*f* of the end point node of the VPN route path.

At the next SR label stack, SID information 16003, 16002, and 16001 are stacked. Thus, the fourth measurement packet 64 transferred to the router 5*f* is transferred in one direction to the router 5*a* of the start point node via the routers 5*c* and 5*b* on the VPN route path.

At the bottom of the next SR label stack, SID information 16006 is stacked. Thus, the fourth measurement packet 64 transferred to the router 5*a* is returned to the delay measurement device 3.

FIG. 8 is a diagram illustrating a VPN route path between bases.

The terminal 41*a* and the terminal 41*b* are related to the first user and installed at different bases. A VPN route path is set between the terminal 41*a* and the terminal 41*b* in the order of routers 5*a*, 5*b*, 5*c*, and 5*f*.

FIG. 9 is a diagram illustrating the first route 71. Hereinafter, SR labels are described for each node. The delay measurement device 3 is given the SR label of 16006. The router 5*a* is given the SR label of 16001. The router 5*b* is given the SR label of 16002. The router 5*c* is given the SR label of 16003. The router 5*d* is given the SR label of 16007. The router 5*e* is given the SR label of 16008. The router 5*f* is given the SR label of 16004.

The first route 71 is a route that reaches the router 5*a* of the start point node from the delay measurement device 3, reaches the end point node in the order of the routers 5*b*, 5*c*, and 5*f*, then returns to the start point node in the order of the routers 5*c*, 5*b*, and 5*a* of the reverse order, and returns to the delay measurement device 3.

FIG. 10 is a diagram illustrating the second route 72. The second route 72 is a route that reaches the router 5*a* of the start point node from the delay measurement device 3 and then returns to the delay measurement device 3.

FIG. 11 is a diagram illustrating the third route 73. The third route 73 is a route that reaches the router 5*a* of the start point node from the delay measurement device 3, reaches the end point node in the order of the routers 5*b*, 5*c*, and 5*f*, and then returns to the delay measurement device 3.

FIG. 12 is a diagram illustrating the fourth route 74. The fourth route 74 is a route that reaches the router 5f of the end point node from the delay measurement device 3, reaches the start point node in the order of the routers 5c, 5b, and 5a, and then returns to the delay measurement device 3.

The delay measurement device 3 exports information on the VPN route path to be measured from the route path control device 2, and calculates the transfer delay for the VPN route path using the round-trip propagation delay of the first measurement packet 61 and the second measurement packet 62. Further, the delay measurement device 3 specifies the direction at the time of the occurrence of the delay variation from the one-way delay of the third measurement packet 63 and the fourth measurement packet 64.

Effects of the Present Embodiment

The delay measurement device can measure the transfer delay for each end point of the VPN to be measured in two packets, and can further measure the direction specification when the delay amount varies in two packets.

Regardless of where the delay measurement device is located in the network, it is possible to control the route of the measurement packet only by following the rules of the SR label stack of the route path, start point, and end point node of the measurement target determined in advance. Since the round-trip propagation delay is measured, time synchronization between a plurality of devices is not required. Therefore, the delay measurement device of the present invention can measure an accurate delay time. Further, since the delay measurement device measures the SR-transferred packet, it can measure an arbitrary link. Therefore, the delay measurement device can measure the route path between arbitrary end points of arbitrary VPN on the network, which has accuracy, economic efficiency, and comprehensiveness.

(Variations)

The present invention is not limited to the above-described embodiment, can be modified without departing from the gist of the present invention, and for example, variations such as the following (a) and (b) are possible.
  (a) Addition of the VPN route correction delay value is an option, and this correction does not have to be performed.
  (b) Specifying the delay variation direction is optional and not essential.

<<Outline of the Present Invention and Operational Effect>>

According to the invention of claim 1, there is provided a delay measurement device that measures a delay time of an end-to-end route path of a virtual private network related to a predetermined user, the device including: a measurement route generation unit configured to generate a first route that transfers to a start point node of a route path, transfers back on the route path, and then returns to itself, and to generate a second route of a route that transfers to the start point node of the route path and returns to itself; a transmission/reception unit configured to transmit and receive packets circulating on the respective routes generated by the measurement route generation unit; a delay measurement unit configured to measure a time from transmission of the packet to reception of the packet by the transmission/reception unit to set the measured time as a delay time of the route; and a one-way delay calculation unit configured to calculate a one-way delay time of the route path by subtracting a delay time of the second route from a delay time of the first route measured by the delay measurement unit and dividing the difference by 2.

In this way, the delay measurement device can measure the VPN route path between arbitrary end points on the network inexpensively, accurately and comprehensively.

In the invention according to claim 2, with the delay measurement device according to claim 1, the one-way delay calculation unit calculates the one-way delay time of the route path by adding a correction delay value to the value obtained by subtracting the delay time of the second route from the delay time of the first route and dividing the difference by 2.

In this way, according to the present invention, a more accurate one-way delay time of the route path can be calculated.

In the invention according to claim 3, the delay measurement device according to claim 1 further includes a delay variation direction specifying unit configured to specify a direction of delay variation when the one-way delay time calculated by the one-way delay calculation unit varies.

In this way, it is possible to detect the delay variation and start processing for specifying the direction of the delay variation, which is the factor of the delay variation.

In the invention according to claim 4, with the delay measurement device according to claim 3, the measurement route generation unit further generates a third route that transfers to the start point node of the route path, transfers in one direction on the route path, and then returns to itself, and generates a fourth route that transfers to the end point node of the route path, transfers in one direction on the route path, and then returns to itself, and the delay variation direction specifying unit specifies the direction of delay variation by comparing a delay time of the third route measured by the delay measurement unit with a delay time of the fourth route.

Thus, the direction of delay variation can be specified.

In the invention according to claim 5, the delay measurement device according to claim 1 further includes a generation unit configured to record and generate route information in which node identifiers of the routes generated by the measurement route generation unit are arranged in packets transmitted to a communication network configured by connecting a plurality of nodes to each other, and a clocking unit configured to clock a time.

Thus, a packet circulating to each node is generated, and a circulation period of the packet can be measured.

In the invention according to claim 6, with the delay measurement device according to claim 5, the plurality of nodes sequentially transfer the packets to nodes corresponding to the node identifiers included in the route information.

In this way, the packet can be circulated to an arbitrary route, so that an arbitrary route can be measured by a single delay measurement device.

According to the invention of claim 7, there is provided a delay measurement method performed by a delay measurement device that measures a delay time of an end-to-end route path of a virtual private network related to a predetermined user, the method including: generating a first route that transfers to a start point node of a route path from a delay measurement device, transfers back on the route path, and then returns to itself; transmitting and receiving, by a transmission/reception unit, a first packet circulating on the first route; measuring, by a delay measurement unit, a time from transmission of the first packet to reception of the first packet by the transmission/reception unit to set the measured time as a delay time of the first route; generating a second route of a route that transfers to the start point node of the route path and returns to itself; transmitting and receiving, by the transmission/reception unit, a second packet circulating on the second route; measuring, by the delay measurement unit, a time from transmission of the second packet to reception of the second packet by the transmission/reception unit to set the measured time as a delay time of the second route; and calculating a one-way delay time of the route path by subtracting the delay time of the second route from the delay time of the first route measured by the delay measurement unit and dividing the difference by 2.

In this way, it is possible to measure the VPN route path between arbitrary end points on the network inexpensively, accurately and comprehensively.

According to the invention of claim 8, there is provided a delay measurement program for causing a computer to execute: a procedure of generating a first route that transfers to a start point node of a route path, transfers back on the route path, and then returns to itself; a procedure of transmitting and receiving a first packet circulating on the first route; a procedure of measuring a time from transmission of the first packet to reception of the first packet to set the measured time as a delay time of the first route; a procedure of generating a second route of a route that transfers to the start point node of the route path and returns to itself; a procedure of transmitting and receiving a second packet circulating on the second route; a procedure of measuring a time from transmission of the second packet to reception of the second packet to set the measured time as a delay time of the second route; and a procedure of calculating a one-way delay time of the route path by subtracting the delay time of the second route from the delay time of the first route and dividing the difference by 2.

In this way, it is possible to measure the VPN route path between arbitrary end points on the network inexpensively, accurately and comprehensively.

REFERENCE SIGNS LIST

1 Maintenance terminal
2 Route path control device
21 Route path setting unit
22 Route path database
23 Export unit
3 Delay measurement device
31 Measurement route generation unit
32 Packet generation unit (generation unit)
33 Packet transmission/reception unit (transmission/reception unit)
34 Clocking unit
35 Time stamp recording unit
36 Delay measurement unit
37 One-way delay calculation unit
38 Delay variation direction specifying unit
41*a*, 41*b*, 42*a*, 42*b* Terminal
5*a* to 5*f* Router
61 First measurement packet
62 Second measurement packet
63 Third measurement packet
64 Fourth measurement packet
71 First route
72 Second route
73 Third route
74 Fourth route
9 Physical network

The invention claimed is:

1. A delay measurement device for measuring a delay time of an end-to-end route path of a virtual private network related to a predetermined user, the device comprising a storage medium storing instructions and a computer configured to execute the instructions to perform operations comprising:
generating a first route that transfers to a start point node of a route path, transfers back on the route path, and then returns to the delay measurement device;
transmitting and receiving a first packet circulating on the first route;
measuring a time from transmission of the first packet to reception of the first packet to set the measured time as a delay time of the first route;
generating a second route of a route that transfers to the start point node of the route path and returns to the delay measurement device;
transmitting and receiving a second packet circulating on the second route;
measuring a time from transmission of the second packet to reception of the second packet to set the measured time as a delay time of the second route; and
calculating a one-way delay time of the route path by subtracting a delay time of the second route from the delay time of the first route and dividing the difference by 2.

2. The delay measurement device according to claim 1, wherein calculating the one-way delay time of the route path comprises:
adding a correction delay value to the value obtained by subtracting the delay time of the second route from the delay time of the first route and dividing the difference by 2.

3. The delay measurement device according to claim 1, wherein the operations further comprise:
specifying a direction of delay variation when the calculated one-way delay time varies.

4. The delay measurement device according to claim 3, wherein
the operations further comprise:
generating a third route that transfers to the start point node of the route path, transfers in one direction on the route path, and then returns to itself;
generating a fourth route that transfers to an end point node of the route path, transfers in one direction on the route path, and then returns to itself; and
specifying the direction of delay variation by comparing a delay time of the third route with a delay time of the fourth route.

5. The delay measurement device according to claim 1,
Wherein the operations further comprise:
recording and generating route information in which node identifiers of the first and second routes are arranged in packets transmitted to a communication network configured by connecting a plurality of nodes to each other; and
clocking a time.

6. The delay measurement device according to claim 5, wherein the plurality of nodes are configured to sequentially transfer the packets to nodes corresponding to the node identifiers included in the route information.

7. A delay measurement method comprising:
generating a first route that transfers to a start point node of a route path from a delay measurement device, transfers back on the route path, and then returns to the delay measurement device;
transmitting and receiving a first packet circulating on the first route;

measuring a time from transmission of the first packet to reception of the first packet to set the measured time as a delay time of the first route;

generating a second route of a route that transfers to the start point node of the route path and returns to the delay measurement device;

transmitting and receiving a second packet circulating on the second route;

measuring a time from transmission of the second packet to reception of the second packet to set the measured time as a delay time of the second route; and calculating a one-way delay time of the route path by subtracting the delay time of the second route from the delay time of the first route and dividing the difference by 2.

8. The delay measurement method of claim 7, wherein calculating the one-way delay time of the route path comprises:

adding a correction delay value to the value obtained by subtracting the delay time of the second route from the delay time of the first route and dividing the difference by 2.

9. The delay measurement method of claim 7, further comprising:

specifying a direction of delay variation when the calculated one-way delay time varies.

10. The delay measurement method of claim 9, further comprising:

generating a third route that transfers to the start point node of the route path, transfers in one direction on the route path, and then returns to itself;

generating a fourth route that transfers to an end point node of the route path, transfers in one direction on the route path, and then returns to itself; and specifying the direction of delay variation by comparing a delay time of the third route with a delay time of the fourth route.

11. The delay measurement method of claim 7, further comprising:

recording and generating route information in which node identifiers of the first and second routes are arranged in packets transmitted to a communication network configured by connecting a plurality of nodes to each other; and clocking a time.

12. The delay measurement method of claim 11, wherein the plurality of nodes sequentially transfer the packets to nodes corresponding to the node identifiers included in the route information.

13. A non-transitory computer-readable medium storing delay measurement program for causing a computer to execute operations comprising:

generating a first route that transfers to a start point node of a route path, transfers back on the route path, and then returns to itself;

transmitting and receiving a first packet circulating on the first route;

measuring a time from transmission of the first packet to reception of the first packet to set the measured time as a delay time of the first route;

generating a second route that transfers to the start point node of the route path and returns to itself;

transmitting and receiving a second packet circulating on the second route;

measuring a time from transmission of the second packet to reception of the second packet to set the measured time as a delay time of the second route; and calculating a one-way delay time of the route path by subtracting the delay time of the second route from the delay time of the first route and dividing the difference by 2.

14. The non-transitory computer-readable medium of claim 13, wherein calculating the one-way delay time of the route path comprises:

adding a correction delay value to the value obtained by subtracting the delay time of the second route from the delay time of the first route and dividing the difference by 2.

15. The non-transitory computer-readable medium of claim 13, wherein the operations further comprise:

specifying a direction of delay variation when the calculated one-way delay time varies.

16. The non-transitory computer-readable medium of claim 15, wherein the operations further comprise generating a third route that transfers to the start point node of the route path, transfers in one direction on the route path, and then returns to itself;

generating a fourth route that transfers to an end point node of the route path, transfers in one direction on the route path, and then returns to itself; and specifying the direction of delay variation by comparing a delay time of the third route with a delay time of the fourth route.

17. The non-transitory computer-readable medium of claim 13, wherein the operations further comprise recording and generating route information in which node identifiers of the first and second routes are arranged in packets transmitted to a communication network configured by connecting a plurality of nodes to each other; and clocking a time.

18. The non-transitory computer-readable medium of claim 17, wherein the plurality of nodes sequentially transfer the packets to nodes corresponding to the node identifiers included in the route information.

* * * * *